(12) United States Patent
Fugier et al.

(10) Patent No.: US 7,960,482 B2
(45) Date of Patent: Jun. 14, 2011

(54) LOW GLOSS COIL POWDER COATING COMPOSITION FOR COIL COATING

(75) Inventors: Roger Fugier, Montbrison (FR); Vincent Berger, Sorbiers (FR)

(73) Assignee: DuPont Powder Coatings France SAS

( * ) Notice: Subject to any disclaimer, the term of this patent is extended or adjusted under 35 U.S.C. 154(b) by 15 days.

(21) Appl. No.: 12/505,234

(22) Filed: Jul. 17, 2009

(65) Prior Publication Data

US 2010/0010151 A1   Jan. 14, 2010

Related U.S. Application Data

(63) Continuation-in-part of application No. 11/636,914, filed on Dec. 11, 2006, now abandoned.

(51) Int. Cl.
  *C08G 63/16* (2006.01)
(52) U.S. Cl. .................. 525/444; 525/438; 525/934
(58) Field of Classification Search .................. 525/444, 525/437, 448, 444.5
  See application file for complete search history.

(56) References Cited

U.S. PATENT DOCUMENTS

| | | | |
|---|---|---|---|
| 3,842,035 | A | 10/1974 | Klaren |
| 3,953,403 | A | 4/1976 | Fujiyoshi et al. |
| 4,255,553 | A | 3/1981 | Mizumura et al. |
| 4,463,140 | A | 7/1984 | Belder et al. |
| 5,264,529 | A | 11/1993 | Nozaki et al. |
| 5,457,168 | A | 10/1995 | Cotting et al. |
| 6,350,821 | B1 | 2/2002 | Alford |
| 6,403,757 | B1 | 6/2002 | Yabuta et al. |
| 6,897,265 | B2 | 5/2005 | Algrim et al. |
| 7,071,267 | B2 | 7/2006 | Algrim et al. |
| 2001/0006993 | A1 | 7/2001 | Ring et al. |
| 2002/0032275 | A1 | 3/2002 | Falcone et al. |
| 2003/0100678 | A1 | 5/2003 | Nicholl et al. |
| 2003/0134978 | A1 | 7/2003 | Tullos et al. |
| 2004/0071955 | A1 | 4/2004 | Moens et al. |
| 2004/0081850 | A1 | 4/2004 | Algrim et al. |
| 2004/0082733 | A1 | 4/2004 | Algrim et al. |
| 2005/0090627 | A1 | 4/2005 | Wenning et al. |
| 2006/0229400 | A1 | 10/2006 | Fletcher |

FOREIGN PATENT DOCUMENTS

| | | |
|---|---|---|
| EP | 0244823 | 11/1987 |
| EP | 0383691 | 8/1990 |
| EP | 0870808 | 10/1998 |
| EP | 0947254 | 3/1999 |
| EP | 1057975 | 12/2000 |
| EP | 1129788 | 2/2001 |
| JP | 49093425 | 9/1974 |
| JP | 49128939 | 12/1974 |
| JP | 49129725 | 12/1974 |
| JP | 52150443 | 12/1974 |
| JP | 54036339 | 11/1979 |
| JP | 54150440 | 11/1979 |
| JP | 54158440 | 12/1979 |
| JP | 55003416 | 1/1980 |
| JP | 55025462 | 2/1980 |
| JP | 55027307 | 2/1980 |
| JP | 56100870 | 8/1981 |
| JP | 60168771 | 9/1985 |
| JP | 61236868 | 10/1986 |
| JP | 04227713 | 8/1992 |
| JP | 2004/27713 | 1/2004 |
| KR | 2002053470 | 7/2002 |
| WO | 02/072664 | 9/2002 |
| WO | 03/102048 | 5/2003 |

OTHER PUBLICATIONS

Machine Translation of KR 2002053470 A. Published Jul. 5, 2002.*
Final Office Action dated Mar. 18, 2009 in U.S. Appl. No. 11/636,914, filed Dec. 11, 2006.
Office Action dated Aug. 11, 2008 in U.S. Appl. No. 11/636,914, filed Dec. 11, 2006.

* cited by examiner

*Primary Examiner* — Randy Gulakowski
*Assistant Examiner* — Mike Dollinger

(57) ABSTRACT

A powder coating composition obtainable by homogeneous mixing of at least two separately produced powder coating compositions as powder coating bases to yield coating compositions having good storage stability and coatings with controlled low gloss levels as well as high exterior durability and stable flexibility.

6 Claims, No Drawings

LOW GLOSS COIL POWDER COATING COMPOSITION FOR COIL COATING

This is a Continuation-in-Part of application Ser. No. 11/636,914 filed 11 Dec. 2006 now abandoned which claims the benefit of European Patent Application No. 05 292 704 filed 15 Dec. 2005.

FIELD OF THE INVENTION

The present invention is directed to a powder coating composition providing a gloss-controlled coating which is suitable for coil coating of substrate surfaces, which is a significant improvement over the systems currently employed in that they present health advantages.

DESCRIPTION OF PRIOR ART

Coil coating of substrates is a process of coating strips or sheets of, e.g., metal articles that are in the shape of coils, with liquid or powder coating compositions. In general, such coils are being un-wound, and are then coated, cured in an oven, cooled down and are then re-wound again. This process proceeds under high speed, e.g. at coating speeds of, for example, >50 m/min.

Powder coating compositions are being used more and more for that kind of coating process. Especially thermosetting powder compositions are used based on polyesters as binder resin and typical curing agents, such as solid polyepoxides, more particularly, for example, triglycidyl isocyanurate (TGIC).

The polyester/TGIC system gives coatings with good properties for outdoor use, especially for the coating of metal substrates, where properties, such as weather durability and chemical resistance, as well as fast curing of the coating and flexibility of the cured coating system, are very desirable.

The problem arising with these systems is high toxicity of TGIC, a product of mutagenic character apart from being an irritant to the skin and the mucosae, toxic on inhalation, and the like. Toxicity compels the introduction of robust safety measures from the standpoint of the health of the workforce, the personnel having to be appropriately protected and to submit to the appropriate medical checks, thereby entailing substantial costs in addition to the already high cost of TGIC.

Accordingly, there is a need to replace the polyester resin/TGIC system with other, less harmful and less expensive systems.

U.S. Patent application Publication 2004/0071955 A1 to Moens et al. describes a thermosetting powder composition that is based on blending three components together selected from an amorphous polyester component, rich in isophthalic acid, and having an acid number of 15-100 mg of KOH/g, a semi-crystalline polyester component having an acid number of 5-50 mg KOH/g, and a cross-linking agent. These compositions are described as capable of producing half-gloss or matt coatings, but not improved impact resistance or high flexibility.

There are numerous patents in which the use of organic peroxides as curing initiator or agent is described for different types of resins, e.g. JP 49128939, JP 49040348, JP 55025462, DE2332749, JP 54150440, JP 55027307, JP 56100870, JP 55003416, JP 54158440, JP 52150443, JP49129725, JP-04/227713 and JP 49093425. Such formulations are not suitable for coil coating processes.

In the article "Rund um TGIC-freie Pulverlacke" (Th. Brock, Farbe & Lack, volume 106, 2/2 000, pages 38 to 44), alternatives of TGIC substitutes are named, such as polyurethanes, anhydrides+glycidylmethacrylate and hydroxyl alkyl amides. The TGIC-free powder coats may have good coating properties, but they show difficulties regarding weather resistance, generating pinholes and problems regarding balance of flow and sagging properties, and low storage stability.

The use of matting agents to adjust the gloss to a desired level is well known as described, for example, in WO 03/102048, U.S. 2003/0134978, EP-A 1129788 and EP-A 0947254. Examples for such agents are waxes, silica, glass pearls, and crystalline resins. Such compositions often lead to coatings with a loss in technological properties.

Another technique for forming a matting effect is the use of dry-blends of chemically incompatible powders. However, these processes often provide no coatings with high performed properties whereby the coatings can be applied by coil coating methods at the same time.

There is a need for improved coating compositions suitable for coil coating applications which overcome the drawbacks of toxicity presented by TGIC, and also overcome disadvantages presented by the known TGIC alternatives, and which may be cured at a short time and result in gloss-controlled coatings.

SUMMARY OF THE INVENTION

The present invention provides a powder coating composition obtainable by homogeneously mixing of at least two separately produced powder coating compositions as powder coating bases comprising
 (A) 45 to 70 wt %, based on the total weight of the powder coating composition, of at least one powder coating base comprising one or more carboxylic functional polyester resins having an acid value of 20 mg KOH/g, or in the range of 20 mg KOH/g, and one or more glycidylester and/or glycidylether as hardener selected from the group consisting of triglycidyl trimellitate (TML), diglycidyl terephthalate (DGT) and glycidyl ethers based on aliphatic or cycloaliphatic epoxy resins, together with at least one coating additive, and optionally pigments and/or fillers, wherein the powder coating base contains in the range of from 60 wt % up to 67 wt % of the polyester resin, and
 (B) 55 to 30 wt %, based on the total weight of the powder coating composition, of at least one powder coating base comprising a carboxylic functional polyester resin having an acid value in the range of >25 to 100 mg KOH/g, and from one or more glycidylester and/or glycidylether as hardener selected from the group consisting of triglycidyl trimellitate (TML), diglycidyl terephthalate (DGT) and glycidyl ethers based on aliphatic or cycloaliphatic epoxy resins, together with at least one coating additive, and optionally pigment and/or filler, wherein the powder coating base contains in the range of from 40 wt % up to 60 wt % of the polyester resin.

In spite of substitution of TGIC, the powder coating composition of this invention are coating compositions having good storage stability and giving coatings with any desired gloss level as well as good coating properties, particularly, high exterior durability and stable flexibility. Surprisingly, the disadvantages caused by the known TGIC substitutes such as pinholes and gassing of the coating may be prevented. The composition of the invention fulfils the requirements of health and safety classification in Europe, e.g. it has not been classified as "Toxic" according to the European Chemicals Regulations, in particular with the phrase R46 (R46 phrases: May cause heritable genetic damage).

The powder coating composition according to the invention is especially suitable for the coil coating technology, that means, for coating applications also under high speed, e.g., at coating speeds of about >50 m/min while also providing coatings with a high flexibility for post forming.

DETAILED DESCRIPTION OF THE INVENTION

The features and advantages of the present invention will be more readily understood, by those of ordinary skill in the art, from reading the following detailed description. It is to be appreciated those certain features of the invention, which are, for clarity, described above and below in the context of separate embodiments, may also be provided in combination in a single embodiment. Conversely, various features of the invention that are, for brevity, described in the context of a single embodiment, may also be provided separately or in any sub-combination. In addition, references in the singular may also include the plural (for example, "a" and "an" may refer to one, or one or more) unless the context specifically states otherwise.

The use of numerical values in the various ranges specified in this application, unless expressly indicated otherwise, are stated as approximations as though the minimum and maximum values within the stated ranges were both preceded by the word "about." In this manner, slight variations above and below the stated ranges can be used to achieve substantially the same results as values within the ranges. Also, the disclosure of these ranges is intended as a continuous range including every value between the minimum and maximum values.

All patents, patent applications and publications referred to herein are incorporated by reference in their entirety.

Suitable polyesters for component A) are carboxylic functional polyester resins having an acid value in the range of 20 mg KOH/g, meaning that the acid value can be 20 mg KOH/g or slightly above or slightly below 20 mg KOH/g and still achieve satisfactory results.

Suitable polyesters for component B) are carboxylic functional polyester resins having an acid value in the range of >25 to 100, preferably in the range of 28 to 60.

The acid value is defined as the number of mg of potassium hydroxide (KOH) required to neutralise the carboxylic groups of 1 g of the resin.

The polyesters may be produced in a conventional manner by reacting one or more aliphatic, aromatic or cycloaliphatic di- or polycarboxylic acids, and the anhydrides and/or esters thereof with polyalcohols, as is, for example, described in D. A. Bates, *The Science of Powder Coatings*, volumes 1 & 2, Gardiner House, London, 1990, and as known by the person skilled in the art.

Examples of suitable polycarboxylic acids, and the anhydrides and/or esters thereof include maleic acid, fumaric acid, malonic acid, adipic acid, 1,4-cyclohexane dicarboxylic acid, isophthalic acid, terephthalic acid, acrylic acid, and their anhydride form, or mixtures thereof. Examples of suitable alcohols are benzyl alcohol, butanediol, hexanediol, diethylene glycol, pentaerytritol, neopentyl glycol, propylene glycol, and mixtures thereof.

The carboxyl group containing polyesters may be used together with small amounts of hydroxyl group containing polyesters, for example 0 to 10 wt % of hydroxyl group containing polyesters having a hydroxy value of, for example, 10 to 200.

Preferred for economic and other reasons is the use of carboxyl-functionalized polyesters without any addition of hydroxyl group containing polyesters.

The carboxyl group containing polyesters have a glass transition temperature Tg in a range of, e.g., 35° C. to 80° C., preferably 50° C. to 75° C., Tg being determined by means of differential scanning calorimetry (DSC). The number average molecular weight Mn of the resins is in the range of, e.g., 2 000 to 10 000, Mn being determined from gel permeation chromatography (GPC) using polystyrene standard.

Crystalline and/or semi-crystalline saturated carboxylic functional polyesters are also usable which have a Tm (melting temperature) in the range of e.g., 50° C. to 150° C., determined by means of DSC. However, satisfactory results can be achieved according to the invention without regard to whether the polyester constituent for either component A) or component B) is amorphous or semi-crystalline.

The polyesters of the invention can also be partially self cross-linkable polyesters containing cross-linkable functional groups known by a person skilled in the art.

Glycidylesters and/or glycidylethers may be used as hardeners in component A) and in component B) and are selected from the group consisting of polyglycidyl ethers based on aliphatic or cycloaliphatic epoxy resins, TML and DGT. Preferred is the use of TML and DGT in solid form.

Polyglycidyl ethers based on aliphatic or cycloaliphatic epoxy resins can be used which are known in the powder coating area.

The hardeners of the invention may be used together with small amounts of other suitable hardeners known by the person skilled in the art, for example, blocked polyisocyates such as, e.g. aliphatic diisocyanates, for example, in quantities in the range of 0 to 10 wt %.

The content of the polyester resin in component A) and in component B) may be in a range, for example, between 40 wt % and 95 wt %, although for best results, the content of the polyester resin in component A) is between 60 wt % and 67 wt %, and the content of the polyester resin in component B) is in the range of from 40 wt % to 60 wt %.

The content of the hardener in component A) and in component B) may be, for example, in a range between 2 wt % and 30 wt %, preferably in the range of 3 to 20 wt %.

The powder coating base of component A) and of component B) may contain as further components the constituents conventional in powder coating technology, such as additives, pigments and/or fillers as known by a person skilled in the art.

Additives are, for example, degassing auxiliaries, flow-control agents, flatting agents, texturing agents, fillers (extenders), catalysts, dyes, anti-oxidant, anti-UV, tribostatic or corona electrostatic charging auxiliaries. Compounds having anti-microbial activity may also be added to the powder coating compositions.

The cross-linking reaction may, if desired, be accelerated by the presence in the powder coating composition according to the invention of catalysts known from thermal crosslinking. Such catalysts are, for example, tin salts, phosphides, amines, ammonium salts, cyclic amidines, phosphonium salts, alkyl- or aryl-imidazolines, and amides. They may be used, for example, in quantities of 0.02 to 3 wt %, based on the total weight of each powder coating base.

The powder coating base A) and B) may contain transparent, color-imparting and/or special effect-imparting pigments and/or fillers (extenders). Suitable color-imparting pigments are any conventional coating pigments of an organic or inorganic nature. Examples of inorganic or organic color-imparting pigments are titanium dioxide, micronized titanium dioxide, carbon black, azopigments, and phthalo-cyanine pigments. Examples of special effect-imparting pigments are metal pigments, for example, made from aluminum, copper or other metals, interference pigments, such as, metal oxide coated metal pigments and coated mica. Examples of usable extenders are silicon dioxide, aluminum silicate, barium sulfate, and calcium or magnesium carbonate, micronized dolomite.

The constituents are used in conventional amounts known to the person skilled in the art, for example, based on the total weight of each powder coating base, regarding pigments and/or fillers in quantities of 0 to 40 wt. %, preferred 0 to 35 wt %, regarding the additives in quantities of 0.01 to 5%, preferred 1 to 3 wt %.

The powder coating base of A) and of B) are separately prepared by conventional manufacturing techniques used in the powder coating industry, such as, for example, extrusion and/or grinding processes. Each of powder coating components A) and B) represent separate and distinct coating compositions that, when combined together according to the invention, result in an improved powder coating composition capable of producing a coating having controlled gloss coupled with excellent impact resistance and higher flexibility than either composition can achieve if applied alone.

The ingredients of each powder coating base can be blended together and heated to a temperature to melt the mixture, and then the mixture is extruded. The extruded material is then cooled on chill roles, broken up and ground to a fine powder, which can be classified to the desired grain size, for example, to a median particle size of 20 to 200 μm, preferred 20 to 50 μm.

Each powder coating base may also be prepared by spraying from supercritical solutions, NAD ("non-aqueous dispersion") processes or ultrasonic standing wave atomization processes.

Furthermore, specific components of the powder coating base according to the invention, for example, additives, pigment, fillers, may be processed with the finished powder coating particles after extrusion and grinding by a "bonding" process using an impact fusion. For this purpose, the specific components may be mixed with the powder coating particles. During blending, the individual powder coating particles are treated to soften their surface so that the components adhere to them and are homogeneously bonded with the surface of the powder coating particles. The softening of the powder particles' surface may be done by heat treating the particles to a temperature, e.g. the glass transition temperature Tg of the composition, in a range, of e.g., 50° C. to 60° C. After cooling the mixture the desired particle size of the resulted particles may be recovered by a sieving process.

The powder coating base of component A) and the powder coating base of component B) may be mixed together in a mixing ratio of component A) to component B) of 45:55 to 70:30, relative to weight. That is to say, the powder coating composition according to the invention is used comprising 45 to 70 wt % of the powder coating base A) and 55 to 30 wt % of the powder coating base B).

The powder coating composition according to the invention may provide powder coatings with a desirable low or medium gloss level. Therefore, this invention provides also a process for preparing powder coatings with a controlled gloss level.

The gloss level (value) of finishes according to this invention is measured at 60° angle according to EN ISO 2813:1999 and can be adjusted in the range of 1 to 95 gloss units (GU) by using the composition according to the invention. Typically, a low gloss (matt finish) has a gloss level value in the range of 10 to 30 GU, and a medium gloss finish has a gloss level value in the range of 30 to 70 GU.

The present invention also provides a process in which a powder coating composition comprising:

(A) 45 to 70 wt % of at least one powder coating base prepared from one or more carboxylic functional polyester resins having an acid value in the range of 20 mg KOH/g, and from one or more glycidylester and/or glycidylether as hardener selected from the group consisting of triglycidyl trimellitate (TML), diglycidyl terephthalate (DGT) and glycidyl ethers based on aliphatic or cycloaliphatic epoxy resins, together with at least one coating additive, and optionally pigments and/or filler, and (B) 55 to 30 wt % of at least one powder coating base prepared from one or more carboxylic functional polyester resins having an acid value in the range of >25 to 100 mg KOH/g, and from one or more glycidylester and/or glycidylether as hardener selected from the group consisting of triglycidyl trimellitate (TML), diglycidyl terephthalate (DGT) and glycidyl ethers based on aliphatic or cycloaliphatic epoxy resins, together with at least one coating additive, and optionally pigment and/or filler, the wt % being based on the total weight of the powder coating composition, is produced in such a manner that component A) and component B) are initially produced separately using conventional powder coating production processes, and then the two components A) and B) in the stated mixing ratio are subjected to a further operation, for example an extrusion operation, to ensure homogeneous mixing of the two components to form the final powder coating composition of the invention.

The powder coating composition of this invention may be applied by, e.g., electrostatic spraying, thermal or flame spraying, or fluidized bed coating methods, all of which are known to those skilled in the art.

The powder coating composition according to the invention is especially suitable for the coil coating technique at coating speeds of, for example, from 5 to 50 m/min, also at high speed coating, at coating speeds of, for example, >50 m/min.

Coil coating techniques, such as cloud technology generated by rotating brush and electromagnetic brush technology (EMB) as well as other known application techniques like corona or tribostatic sprayer guns or rotative bells projectors are examples of the application by coil coating procedures known by a person skilled in the art. For example, the metal sheets or strips may be disposed on a horizontal conveyor during coil coating.

The coating compositions may be applied to, e.g., metallic substrates, non-metallic substrates, such as, paper, wood, plastics, glass and ceramics, as a one-coating system or as coating layer in a multi-layer film build. In certain applications, the substrate to be coated may be pre-heated before the application of the powder composition, and then either heated after the application of the powder or not. For example, gas is commonly used for various heating steps, but other methods, e.g., microwaves, conduction methods, Infrared (IR) radiation, near infrared (NIR) radiation, electrical induction heating are also known. Catalytic gas infrared ovens and electric infrared oven are commonly used, frequently coupled with gas convection ovens.

The powder coating compositions according to the invention can be applied directly on the substrate surface or on a layer of a primer which can be a liquid or a powder based primer. The powder coating compositions according to the invention can also be applied as a coating layer of a multilayer coating system based on liquid or powder coats, for example, based on a powder or liquid clear coat layer applied onto a color-imparting and/or special effect-imparting base coat layer or a pigmented one-layer powder or liquid top coat applied onto a prior coating.

The applied and melted powder coating layer can be cured by thermal energy. The coating layer may, for example, be exposed by convective, gas and/or radiant heating, e.g., infra red (IR) and/or near infra red (NIR) irradiation, as known in the art, to temperatures of, e.g., 100° C. to 300° C., preferably of 180° C. to 280° C. (object temperature in each case).

If the composition according to the invention is used together with unsaturated resins and, optionally photo-initiators or with unsaturated resin containing powders, dual curing may also be used. Dual curing means a curing method of the powder coating composition according to the invention where the applied composition can be cured, e.g., both by high energy radiation such as, e.g. ultra violet (UV) irradiation, and by thermal curing methods known by a skilled person.

The present invention is further defined in the following Examples. It should be understood that these Examples are given by way of illustration only. From the above discussion and these Examples, one skilled in the art can ascertain the essential characteristics of this invention, and without departing from the spirit and scope thereof, can make various changes and modifications of the invention to adapt it to various uses and conditions. As a result, the present invention is not limited by the illustrative examples set forth herein below, but rather is defined by the claims contained herein below.

The following Examples illustrate the invention.

EXAMPLES

Example 1

Manufacture of a Powder Coating Composition and Application

A powder coating composition according to the invention (Formulation 1) is prepared according to the following ingredients:

| Formulation 1 | | | |
|---|---|---|---|
| Component A | Weight % | Component B | Weight % |
| Crylcoat 2432 (COOH— polyester, acid value 20) | 60.5 | Crylcoat 2514 (COOH— polyester, acid value: 47) | 43.0 |
| Araldite PT 912 (mixture of TML and DGT) | 4.0 | COOH—polyester, acid value: 28 | 13.5 |
| Resiflow PV88 (flow agent) | 1.0 | Araldite PT 912 | 7.4 |
| 2-Phenyl imidazoline | 0.9 | Resiflow PV88: flow agent | 1.0 |
| Benzoin | 0.5 | Benzoin | 0.5 |
| TiPure R706: Titanium dioxide | 32.5 | Accelerator DT3126 in (quaternary ammonium salt) | 2.2 |
| Carbon black in 1% mixture with barium sulfate | 0.6 | TiPure R706 | 31.8 |
| | | Carbon black in 1% mixture with barium sulfate | 0.6 |

The ingredients of each component A) and of each component B) are separately mixed together and separately extruded in an extruder PR 46 (firm: Buss AG) at 120° C. The melt-mixed formulation is cooled and the resulted material is separately ground to a D50 value of 35 μm particle size distribution.

The final powder composition is obtained by mixing 50 wt % of component A) and 50 wt % of component B) to ensure homogeneous mixing.

The final powder composition is applied to 1-mm thick steel sheet using the coil coating technology and cured by medium wave infrared electric emitters at a temperature in the range of 200° C. to 255° C. The total heating time is 105 seconds, and the cooling time is 30 seconds by cool air. The resulting film thickness is 70 μm.

Example 2

Coating Properties

TABLE 1

| | Test | | | |
|---|---|---|---|---|
| | Exterior durability (45° vertical, South Direction, after 2 years) | Flexibility (Post forming) ECCA T7 1996 | Gassing (Pinholes, visual observation) | Gloss NF EN ISO 2813 |
| Result | More than 80% gloss retention, Less than 0.2 ΔL*, ΔC* < 0.2 | O-T bend without cracks | No pinholes | 30 GU |

Example 3

Formulation 1 (Different Ratios of Component A) and Component B) According to the Invention)

Formulation 1 of Example 1 was repeated, but with variation of the mixing ratio between Component A) and Component B). The powder base compositions were combined in the ratio 70/30 and the ratio 45/55, applied and cured in the same manner as described in Example 1. Tests were carried out as described in Example 2. The results are shown in Table 2:

TABLE 2

| Ratio of composition (A) to composition (B) | Flexibility (Post forming) ECCA T7 1996 | Gassing (Pinholes, visual observation) | Gloss NF EN ISO 2813 |
| --- | --- | --- | --- |
| 50/50 | 0T without cracks | No pinholes | 30 GU |
| 70/30 | 0T without cracks | No pinholes | 40 GU |
| 45/55 | 0T without cracks | No pinholes | 35 GU |

The coatings exhibit unexpectedly high flexibility without cracks and demonstrate low gloss (30 to 40 GU).

Example 4

Formulation 2 (Variation of Formulation 1)

Formulation 1 of Example 1 was repeated, but with variation of the content of polyester in Component A) and Component B). In Component B) the COOH-polyester acid value 28 was no longer an ingredient. The content of the other ingredients in Component A) and Component B) are the same as described for Formulation 1 in Example 1:

| Component A) | | Component B) | |
| --- | --- | --- | --- |
| Crylcoat 2432 | 60 wt % | Crylcoat 2514 | 56 wt % |
| Araldite PT912 | 4.5 wt % | Araldite PT912 | 7.9 wt % |

The powders based on different ratios were prepared, applied and cured in the same manner as described in Example 1 of the. Tests were the same as described in Example 2 above. The results are shown in Table 3.

TABLE 3

| Ratio of composition (A) to composition (B) | Flexibility (Post forming) ECCA T7 1996 | Gassing (Pinholes, visual observation) | Gloss NF EN ISO 2813 |
| --- | --- | --- | --- |
| 50/50 | 0T without cracks | No pinholes | 30 GU |
| 70/30 | 0T without cracks | No pinholes | 35 GU |
| 45/55 | 0T without cracks | No pinholes | 35 GU |

The coatings exhibit unexpectedly high flexibility without cracks and also demonstrate low gloss (30 to 35 GU).

In spite of substitution of TGIC, the powder coating composition of this invention are coating compositions having a good storage stability and giving coatings with any desired gloss level as well as good coating properties, particularly, high exterior durability and stable flexibility.

What is claimed is:

1. A powder coating composition comprising
(A) 45 to 70 wt %, based on the total weight of the powder composition, of at least one powder coating base comprising one or more carboxylic functional polyester resins having an acid value in the range of 20 mg KOH/g, and from one or more glycidylester and/or glycidylether as hardener selected from the group consisting of triglycidyl trimellitate (TML), diglycidyl terephthalate (DGT) and glycidyl ethers based on aliphatic or cycloaliphatic epoxy resins, together with at least one coating additive, and optionally pigments and/or filler, wherein the powder coating base contains in the range of from 60 wt % to 67 wt % of the polyester resin, and
(B) 55 to 30 wt %, based on the total weight of the powder coating composition, of at least one powder coating base comprising one or more carboxylic functional polyester resins having an acid value in the range of >25 to 100 mg KOH/g, and from one or more glycidylester and/or glycidylether as hardener selected from the group consisting of triglycidyl trimellitate (TML), diglycidyl terephthalate (DGT) and glycidyl ethers based on aliphatic or cycloaliphatic epoxy resins, together with at least one coating additive, and optionally pigment and/or filler, wherein the powder coating base contains in the range of from 40 wt % to 60 wt % of the polyester resin;
wherein the powder coating composition is a homogeneous blend of (A) and (B) and wherein a cured layer of the powder coating composition passes test standard ECCA T7 with no cracks.

2. The powder coating composition of claim 1 wherein the carboxylic functional polyester resin of component A) and B) has a glass transition temperature Tg in a range of 50° C. to 75° C., where Tg is determined by means of differential scanning calorimetry (DSC).

3. The powder coating composition of claim 2 wherein the carboxylic functional polyester resin of component A) and B) has a number average molecular weight Mn in the range of 2 000 to 10 000, where Mn is determined from gel permeation chromatography (GPC) using polystyrene standard.

4. The powder coating composition of claim 3 wherein the hardener is selected from triglycidyl trimellitate and diglycidyl terephthalate.

5. The powder coating composition of claim 4 wherein the content of hardener in component A) and in component B) is in a range of from 2 wt % to 30 wt %.

6. A process for preparing a powder coating composition comprising
(A) 45 to 70 wt %, based on the total weight of the powder coating composition, of at least one powder coating base prepared from one or more saturated carboxylic functional polyester resins having an acid value in the range of 20 mg KOH/g, and from one or more glycidylester and/or glycidylether as hardener selected from the group consisting of triglycidyl trimellitate (TML), diglycidyl terephthalate (DGT) and glycidyl ethers based on aliphatic or cycloaliphatic epoxy resins, together with at least one coating additive, and optionally pigments and/or filler, wherein the powder coating base contains in the range of from 60 wt % to 67 wt % of the polyester resin, and
(B) 55 to 30 wt %, based on the total weight of the powder coating composition, of at least one powder coating base prepared from one or more saturated carboxylic functional polyester resins having an acid value in the range of >25 to q 100 mg KOH/g, and from one or more glycidylester and/or glycidylether as hardener selected from the group consisting of triglycidyl trimellitate (TML), diglycidyl terephthalate (DGT) and glycidyl ethers based on aliphatic or cycloaliphatic epoxy resins, together with at least one coating additive, and optionally pigment and/or filler, wherein the powder coating base contains in the range of from 40 wt % to 60 wt % of the polyester resin,
wherein the process comprises:
(i) preparing component A) and component B) separately from each other by combining their respective ingredients into separate homogeneous mixtures; and
(ii) homogeneously mixing component A) with component B) within said claim-defined wt % range to form the composition; and
wherein a cured layer of the powder coating composition passes test standard ECCA T7 with no cracks.

* * * * *